US008801426B2

(12) United States Patent
Galt et al.

(10) Patent No.: US 8,801,426 B2
(45) Date of Patent: Aug. 12, 2014

(54) INJECTION MOLDING SYSTEM HAVING A DYNAMIC MIXER

(71) Applicant: Husky Injection Molding Systems Ltd., Bolton (CA)

(72) Inventors: John Robert Galt, Nobleton (CA); Stephen Daniel Ferenc, Bolton (CA); Darrin Albert MacLeod, Jeffersonville, VT (US)

(73) Assignee: Husky Injection Molding Systems, Bolton, Ontario (CA)

( * ) Notice: Subject to any disclaimer, the term of this patent is extended or adjusted under 35 U.S.C. 154(b) by 137 days.

(21) Appl. No.: 13/674,996

(22) Filed: Nov. 13, 2012

(65) Prior Publication Data

US 2013/0064922 A1 Mar. 14, 2013

Related U.S. Application Data

(63) Continuation-in-part of application No. PCT/CA2011/050722, filed on Nov. 22, 2011.

(60) Provisional application No. 61/416,763, filed on Nov. 24, 2010.

(51) Int. Cl.
| | |
|---|---|
| *B29C 45/22* | (2006.01) |
| *B29C 45/58* | (2006.01) |
| *B29C 45/27* | (2006.01) |
| *B29C 45/17* | (2006.01) |
| *B29C 45/30* | (2006.01) |

(52) U.S. Cl.
CPC ............... *B29C 45/17* (2013.01); *B29C 45/581* (2013.01); *B29C 2045/308* (2013.01); *B29C 45/2703* (2013.01)

USPC .................. 425/549; 264/328.8; 425/572

(58) Field of Classification Search
USPC ................................. 425/549, 572; 264/328.8
See application file for complete search history.

(56) References Cited

U.S. PATENT DOCUMENTS

| | | | |
|---|---|---|---|
| 5,900,200 A | 5/1999 | Teng | |
| 6,001,296 A | 12/1999 | Rodenburgh et al. | |
| 6,382,528 B1 | 5/2002 | Bouti | |
| 6,468,464 B1 | 10/2002 | Eckardt et al. | |
| 6,544,028 B2 | 4/2003 | Wright et al. | |
| 6,572,361 B2 | 6/2003 | Gould et al. | |
| 7,198,400 B2 | 4/2007 | Unterlander et al. | |

(Continued)

FOREIGN PATENT DOCUMENTS

WO WO 03035358 A1 5/2003

OTHER PUBLICATIONS

International Search Report, 3 pages, Jan. 18, 2012.

*Primary Examiner* — Tim Heitbrink

(57) ABSTRACT

A dynamic mixer and associated injection molding system for mixing a melt flow. The injection molding system includes: a hot runner assembly having a plurality of splits; an injection unit that delivers a melt flow to the plurality of splits in the hot runner assembly via a melt channel; and a dynamic mixer incorporated into the melt channel upstream from the plurality of splits, wherein the dynamic mixer includes a rotor assembly configured to be rotationally driven by the melt flow, and wherein the rotor assembly is further configured to mix the melt flow passing through the melt channel.

31 Claims, 10 Drawing Sheets

(56) References Cited

U.S. PATENT DOCUMENTS

| | | |
|---|---|---|
| 7,655,171 B2 | 2/2010 | Puniello et al. |
| 7,780,895 B2 | 8/2010 | Beaumont |
| 2004/0130062 A1 | 7/2004 | Sicilia |
| 2004/0256768 A1 | 12/2004 | Olaru |
| 2005/0270898 A1* | 12/2005 | Verronneau et al. .......... 425/208 |
| 2009/0212458 A1 | 8/2009 | Woodworth |
| 2013/0147092 A1* | 6/2013 | Jenko et al. ................... 425/549 |

* cited by examiner

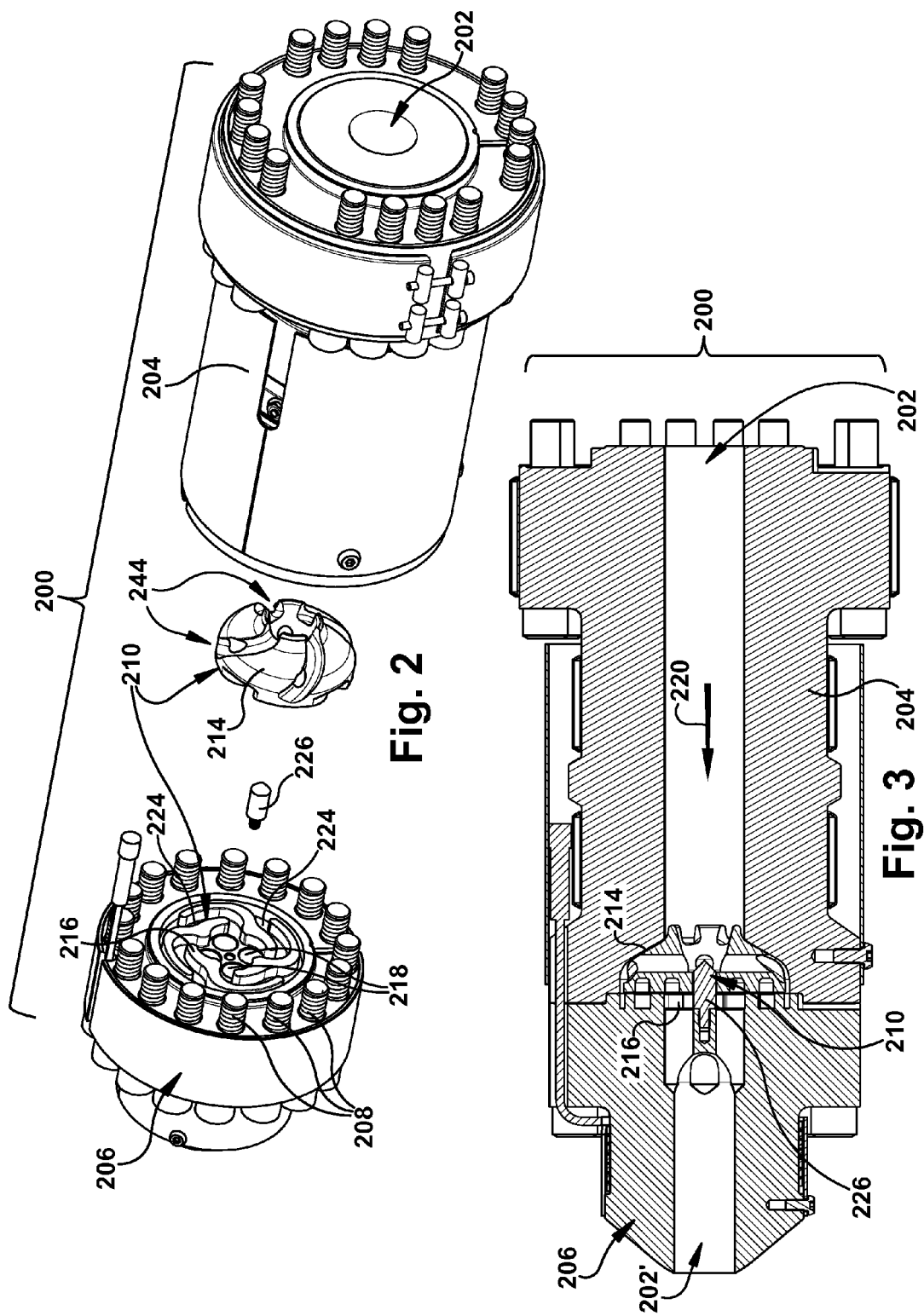

INJECTION MOLDING SYSTEM HAVING A DYNAMIC MIXER

PRIORITY CLAIM

This application is a continuation-in-part of, and claims priority to, co-pending International Patent Application published under the Patent Cooperation Treaty (PCT), International Application No. PCT/CA2011/050722, filed Nov. 22, 2011, and claims priority to U.S. Provisional Application No. 61/416,763, filed Nov. 24, 2010, both of which are incorporated by reference herein.

TECHNICAL FIELD

The invention generally relates to an injection molding system having a dynamic mixer for creating a homogenous melt flow.

BACKGROUND

Injection molding systems are widely used for manufacturing plastic products such as consumer electronic parts, medical components, bottles and caps for beverages, and food containers. Injection molding generally consists of high pressure injection of molten plastic material (i.e., "melt") into a mold that shapes the material to a desired form.

Injection molding systems, including hot-runner systems, cold runner systems, mold assemblies, etc., of the type that are supported by a platen structure (that is, a combination of a movable platen and a stationary platen) include components that are generally known to persons skilled in the art; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9).

As with any manufacturing process, improvements to injection molding systems are constantly being sought to improve efficiencies and reduce defects. One of the many challenges with injection molding systems includes ensuring that the flow of molten plastic material (i.e., "melt flow") remains as homogeneous as possible during the injection cycle.

BRIEF SUMMARY

Embodiments of the present invention dynamically mix melt flowing through a melt channel before the melt enters a hot runner assembly. Mixing the melt creates a more homogenous flow as the melt enters the first split in the hot runner.

In a first aspect, the invention provides an injection molding system, comprising: a hot runner assembly having a plurality of splits; an injection unit that delivers a melt flow to the plurality of splits in the hot runner assembly via a melt channel; and a dynamic mixer incorporated into the melt channel upstream from the plurality of splits, wherein the dynamic mixer comprises a rotor assembly configured to be rotationally driven by the melt flow, and wherein the dynamic mixer is further configured to mix the melt flow passing through the melt channel.

In a second aspect, the invention provides a nozzle assembly, comprising: a machine nozzle adaptor body; a machine nozzle tip; a melt channel passing through the machine nozzle adaptor body and machine nozzle tip configured to deliver a melt flow; and a dynamic mixer incorporated into the melt channel, wherein the dynamic mixer comprises a rotor assembly configured to be rotationally driven by the melt flow, and wherein the dynamic mixer is further configured to mix the melt flow passing through the melt channel.

In a third aspect, the invention provides a device, configured for incorporation into a melt channel of an injection molding system upstream from a plurality of splits associated with a hot runner assembly, wherein the device comprises a rotor assembly configured to be rotationally driven by a melt flow, and wherein the rotor assembly is further configured to mix the melt flow passing through the melt channel.

Other aspects and features of the non-limiting embodiments may become apparent to those skilled in the art upon review of the following detailed description of the non-limiting embodiments with the accompanying drawings.

BRIEF DESCRIPTION OF THE SEVERAL VIEWS OF THE DRAWINGS

The non-limiting embodiments will be more fully appreciated by reference to the following detailed description of the non-limiting embodiments when taken in conjunction with the accompanying drawings, in which:

FIG. 2 depicts an isometric exploded view of a nozzle assembly having a dynamic mixer in accordance with an embodiment of the invention.

FIG. 3 depicts a cross-sectional view of the nozzle assembly of FIG. 2 having a dynamic mixer in accordance with an embodiment of the invention.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION

Figure 1:
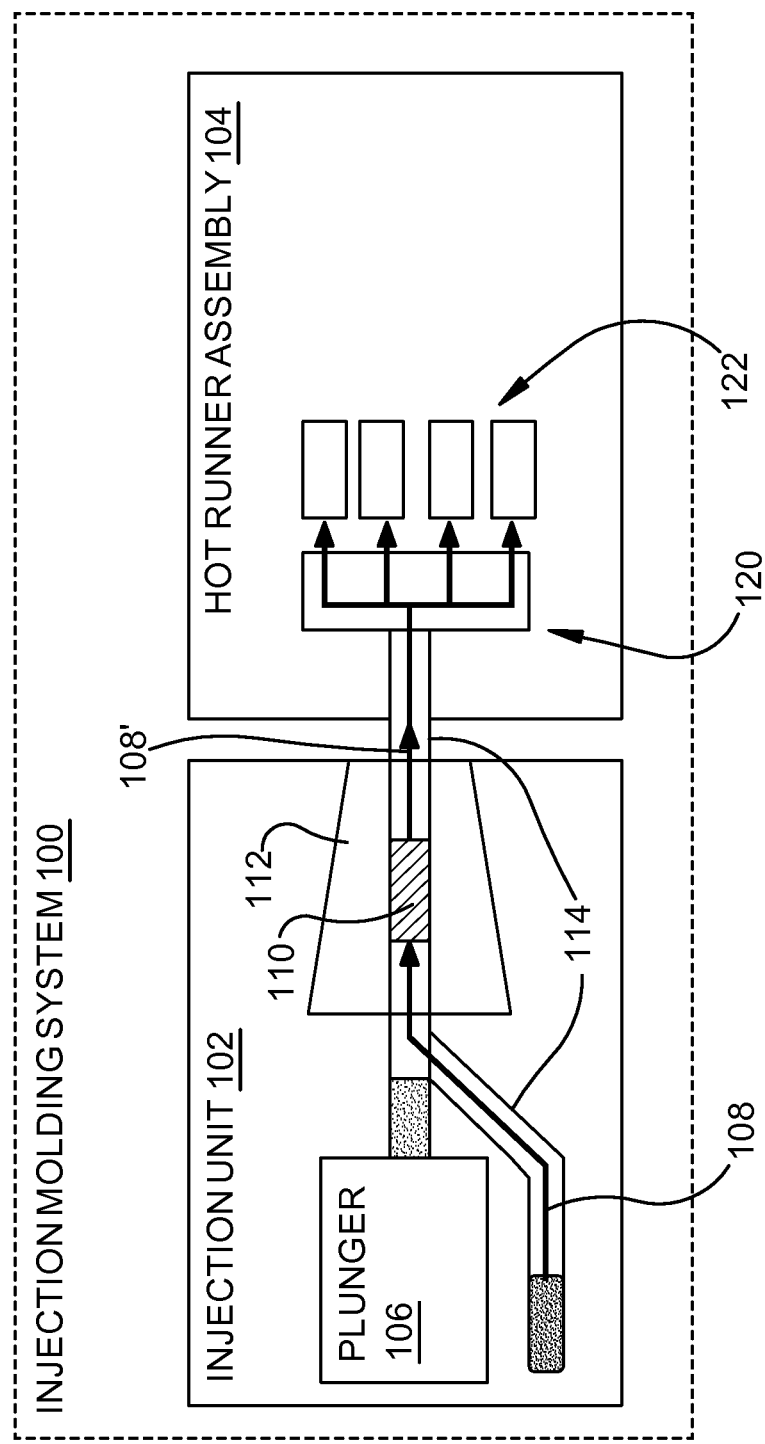
FIG. 1 depicts a block diagram of an injection molding system in accordance with an embodiment of the invention.

FIG. 1 depicts a simplified block diagram of an illustrative injection molding system 100 that generally shows an injection unit 102 and a hot runner assembly 104. Injection unit 102 includes a melt flow 108 that is forced through a nozzle assembly 112, e.g., with a plunger 106, and into hot runner assembly 104. Melt flow 108 is then passed through a series of splits 120 and into a set of molds 122 to form a final set of products. The terms "melt flow" and "flow" generally refer to the movement of any type of molten plastic, resin or substance within an injection molding operation. It is understood that the illustrative system 100 shown in FIG. 1 is provided as a general overview, is not necessarily drawn to scale, and many of the known components found in such a system 100 are not shown.

As noted, one of the challenges with an injection molding system 100 is to ensure that melt flow 108 remains as homogeneous as possible. To help achieve this, a device, referred to herein as a dynamic mixer 110, is placed along melt channel 114 prior to entering a first split 120 of hot runner assembly 104. In the embodiment shown in FIG. 1, it can be seen that dynamic mixer 110 is placed in nozzle assembly 112 that links the injection unit 102 to the hot runner assembly 104. It is understood however that dynamic mixer 110 can be placed anywhere along the melt channel 114 before first split 120 of hot runner assembly 104 in order to create a more homogenous mixture as the melt flow enters the hot runner process.

Dynamic mixer 110 generally comprises a freely rotatable mechanical structure placed within melt channel 114 that spins in response to flowing melt being forced there through. Dynamic mixer 110 is configured to mix non-homogeneous melt flow 108 by splitting melt flow 108 into smaller quantities, shuffling their positions, and redistributing the quantities back into melt channel 114. The result is a homogeneous melt flow 108' entering hot runner assembly 104. Illustrative embodiments of dynamic mixer 110 are described in further detail in the figures that follow.

Figure 4:
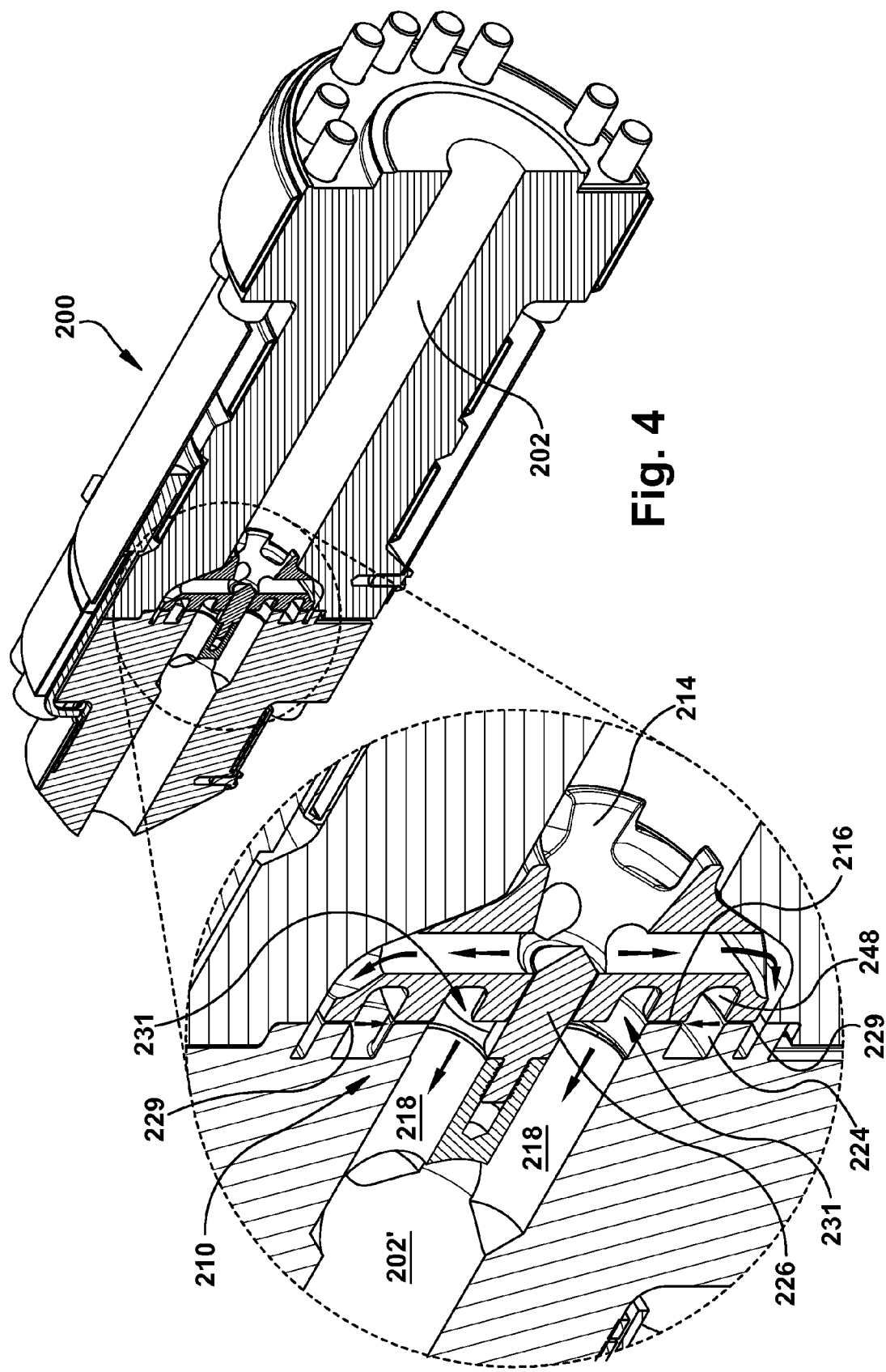
FIG. 4 depicts an isometric view of the nozzle assembly of FIG. 2 including an enlarged view of the dynamic mixer region in accordance with an embodiment of the invention.

FIGS. 2-4 depict an illustrative embodiment of a nozzle assembly 200 having a dynamic mixer 210. FIG. 2 depicts an exploded perspective view, FIG. 3 depicts a fully assembled cross-sectional view, and FIG. 4 depicts an isometric cross-sectional view with an enlarged view of the dynamic mixer 210 region. Nozzle assembly 200 includes a machine nozzle adaptor body 204 and a machine nozzle tip 206. Machine nozzle adaptor body 204 and machine nozzle tip 206 can be coupled together by any known structure, in one example, by at least one bolt 208. In this example, a plurality of bolts 208 are used, as shown in FIG. 2, circumferentially positioned around machine nozzle tip 206 and are configured to engage corresponding bolt holes (not shown) in machine nozzle adaptor body 204.

As shown, dynamic mixer 210 is positioned at the interface of the machine nozzle adaptor body 204 and the machine nozzle tip 206. As such, the mechanical coupling of machine nozzle adaptor body 204 and machine nozzle tip 206 acts to keep dynamic mixer 210 in place within nozzle assembly 200.

Nozzle melt channel 202 may be configured to receive, in use, a melt, e.g., a molten resin, from a melt source along direction of arrow 220 (FIG. 3). In operation, melt flows through the nozzle melt channel 202, first through machine nozzle adaptor body 204, then through dynamic mixer 210, and then through channel 202' of machine nozzle tip 206 to exit into another assembly, for example, a hot-runner assembly.

In this illustrative embodiment, dynamic mixer 210 is implemented with a rotor assembly 214 and a stator assembly 216. Stator assembly 216 remains stationary and may for example be machined into, or fixedly placed into, machine nozzle tip 206. Rotor assembly 214 rotates in response to a melt flow. An alignment shaft 226 can optionally be used to align stator assembly 216 with the melt-driven rotor assembly 214. Alignment shaft 226 can be integral with stator assembly 216 or coupled thereto, e.g., with a threaded connection or other coupling mechanism. Alignment shaft 226 acts to maintain the rotation axis of rotor assembly 214 during rotation thereof. Stator assembly 216 and rotor assembly 214 may be configured to cooperatively mix, in use, the melt that is moved along machine nozzle melt channel 202 of nozzle assembly 200. As described herein, rotation of rotor assembly 214 may be caused or induced by a melt flow striking rotor assembly 214 and moving passed/through rotor assembly 214. It is understood that rotor assembly 214 is a freely rotatable assembly that is not separately powered.

In this illustrative embodiment, dynamic mixer 210 is positioned at the interface of machine nozzle adaptor body 204 and machine nozzle tip 206, such that rotor assembly 214 is primarily placed within machine nozzle adaptor body 204, while stator assembly 216 is primarily placed within machine nozzle tip 206. However, it is understood that dynamic mixer 210 could be placed elsewhere along nozzle melt channel 202 in the nozzle assembly 200. For example, dynamic mixer 210 could be completely positioned within one of either machine nozzle adaptor body 204 or machine nozzle tip 206.

As melt flow passes through nozzle melt channel 202 in the direction of arrow 220 (FIG. 3), rotor assembly 214 is forced to rotate as the melt passes through a set of rotor-drive grooves 244 in rotor assembly 214. Rotor-drive grooves 244 are configured to impart a rotational movement of the rotor assembly 214 in response to a flow. In this example, the grooves are helically "fanned" to cause a rotation in response to melt flow, however it is understood that other configurations could be utilized, e.g., a spiral. The melt exits the spinning rotor assembly 214 and enters a set of stationary channels 224 in stator assembly 216 and then exits trough a set of passages 218 into channel 202' (FIGS. 2-4).

Figure 5:
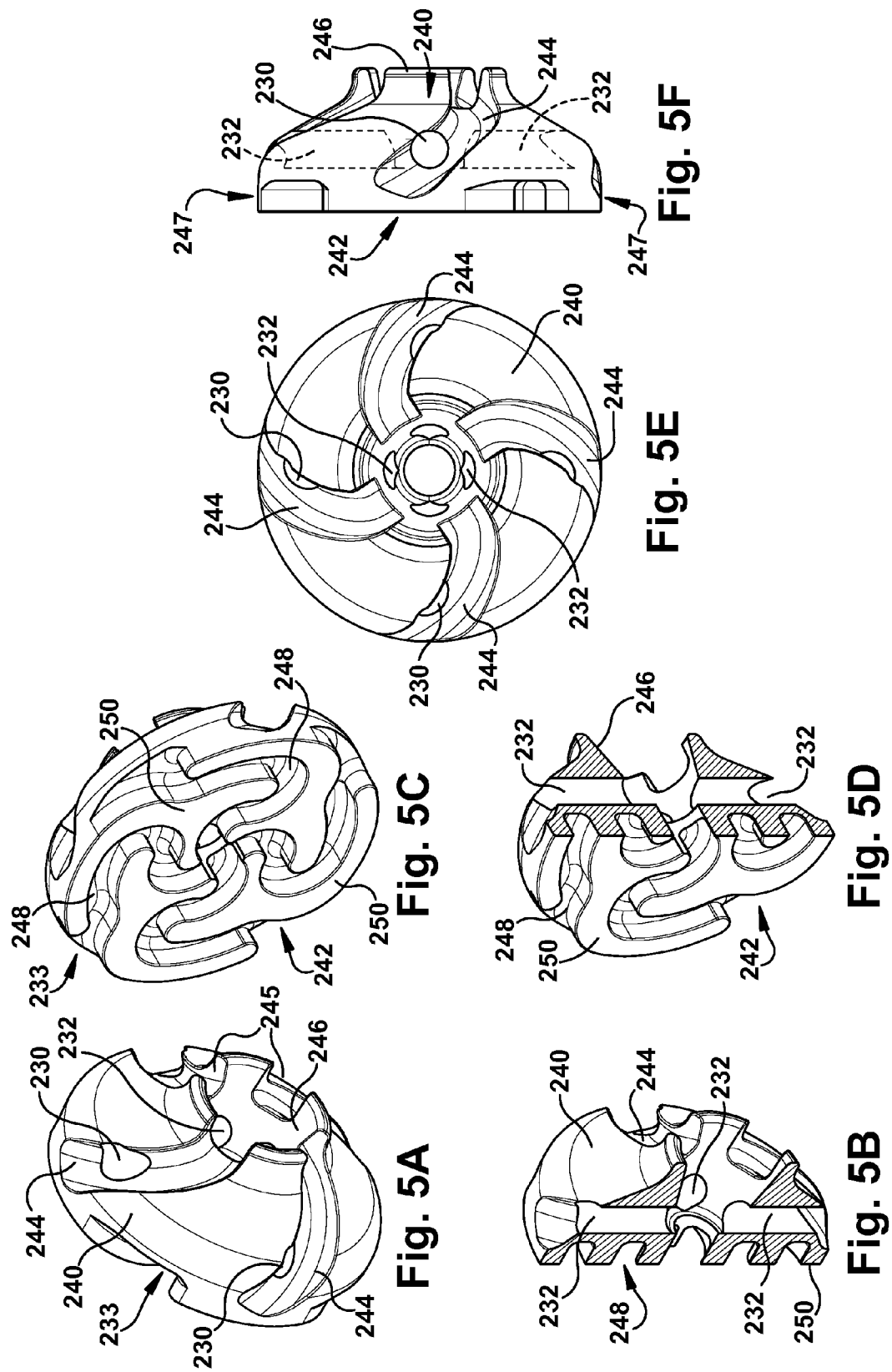
FIGS. 5A-F depict various views of a rotor assembly of the dynamic mixer of FIG. 2 in accordance with an embodiment of the invention.

FIGS. 5 A-F depict various views of rotor assembly 214 of dynamic mixer 210 in further detail. As shown in, e.g., FIGS. 5A and 5F, dynamic mixer 210 includes a first (upstream) side 240 that includes a rotor-castellation structure 246 at a central region and a set of rotor-drive grooves 244 that fan out from indentations 245 on rotor-castellation structure 246.

Rotor-castellation structure 246 diverts flow to both: (1) a set of inner rotor melt channels 232 inside of rotor assembly 214; and (2) rotor-drive grooves 244 on the exterior of rotor assembly 214. Melt that flows through machine nozzle melt channel 202 flows into and along rotor-drive grooves 244 and imparts a rotational force on the rotor assembly 214. Melt flowing through each inner rotor melt channel 232 travels radially outward and exits to an associated rotor-drive groove 244 to form a rotor collision zone 230. Rotor collision zone 230 accordingly recombines melt flowing from different paths.

In the embodiments shown in FIGS. 5A-5F, four inner rotor melt channels 232 and four corresponding rotor-drive grooves 244 are utilized, and each of the inner rotor melt channels 232 are generally oriented perpendicular to the melt flow direction in machine nozzle melt channel 202. Note however that the number and configuration of inner rotor melt channels 232 and rotor-drive grooves 244 may be altered without departing from the scope of the invention.

After the melt flows past upstream side 240 of rotor assembly 214, the melt flows around an outer periphery 247 (FIG. 5F) of rotor assembly 214. From outer periphery 247, the melt is drawn into an interface region 229 (FIG. 4) between a second (downstream) side 242 (FIGS. 5C, D, F) of rotor assembly 214 and a receiving side 254 (FIG. 6) of stator assembly 216. Downstream side 242 of rotor assembly 214 includes a set of rotor channel walls 250 that defines a set of rotor melt channels 248, as shown, e.g., in FIGS. 5B, 5C and 5D. Each rotor melt channel 248 includes an opening 233 (FIGS. 5A and 5C) along outer periphery 247 of rotor assembly 214 to receive flow, and, e.g., an S-shaped canal (FIG. 5C) that directs or channels the flow inwardly.

Figure 6:
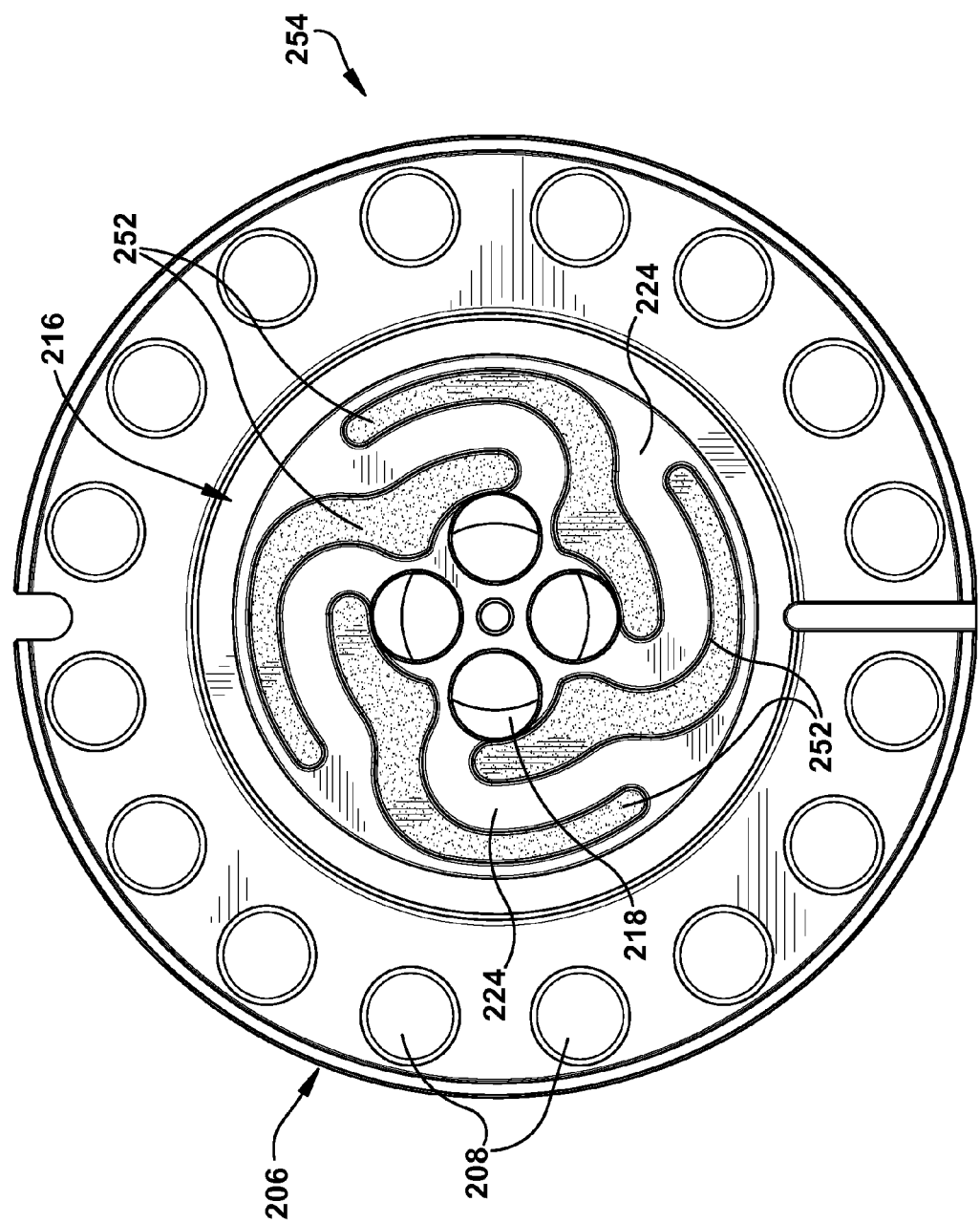
FIG. 6 depicts a cross-sectional view of a stator assembly of the dynamic mixer of FIG. 2 in accordance with an embodiment of the invention.

Referring also to FIG. 6, a cross-sectional view of receiving side 254 of stator assembly 216 is shown that includes a set of stator channel walls 252 that defines a set of stator melt channels 224. Each stator melt channel 224 may match the geometry of an opposed rotor melt channel 248 (FIG. 5C), thus allowing two opposed channels to periodically align (as shown in FIG. 4). Similarly, each rotor channel wall 250 may be similar in geometry to an opposed associated stator channel wall 252. Stator assembly 216 also includes passages 218 in a central region through which the melt exits to machine nozzle melt channel 202'. Note that a clearance may exist at interface region 229 (FIG. 4) between the rotor assembly 214 and stator assembly 216 to allow melt to flow into and around melt channels 248, 224.

At the interface region 229, melt flows inwardly through rotor melt channels 248 and stator melt channels 224 as shown in FIG. 4. Rotor melt channels 248 and stator melt channels 224 may be curved in any manner to e.g., maximize melt flow length so as to further promote mixing of the melt.

In an alternative approach, melt channels 224, 248 may be configured opposite each other such that the melt flow within each rotor melt channel 224 may be in the opposite direction of the melt flow in each stator melt channel 248. The melt flow along opposing directions, or cross flow, may further promote mixing of the melt. It is understood that melt flow channels 224, 248 may be configured in any manner to promote efficient operation and mixing.

Regardless, the melt from both channels 224, 248 ultimately meets at a second collision zone 231 (FIG. 4) in the center of interface region 229, thus providing a second mixing stage. Melt is then forced through passages 218 to channel 202'.

Figure 7:
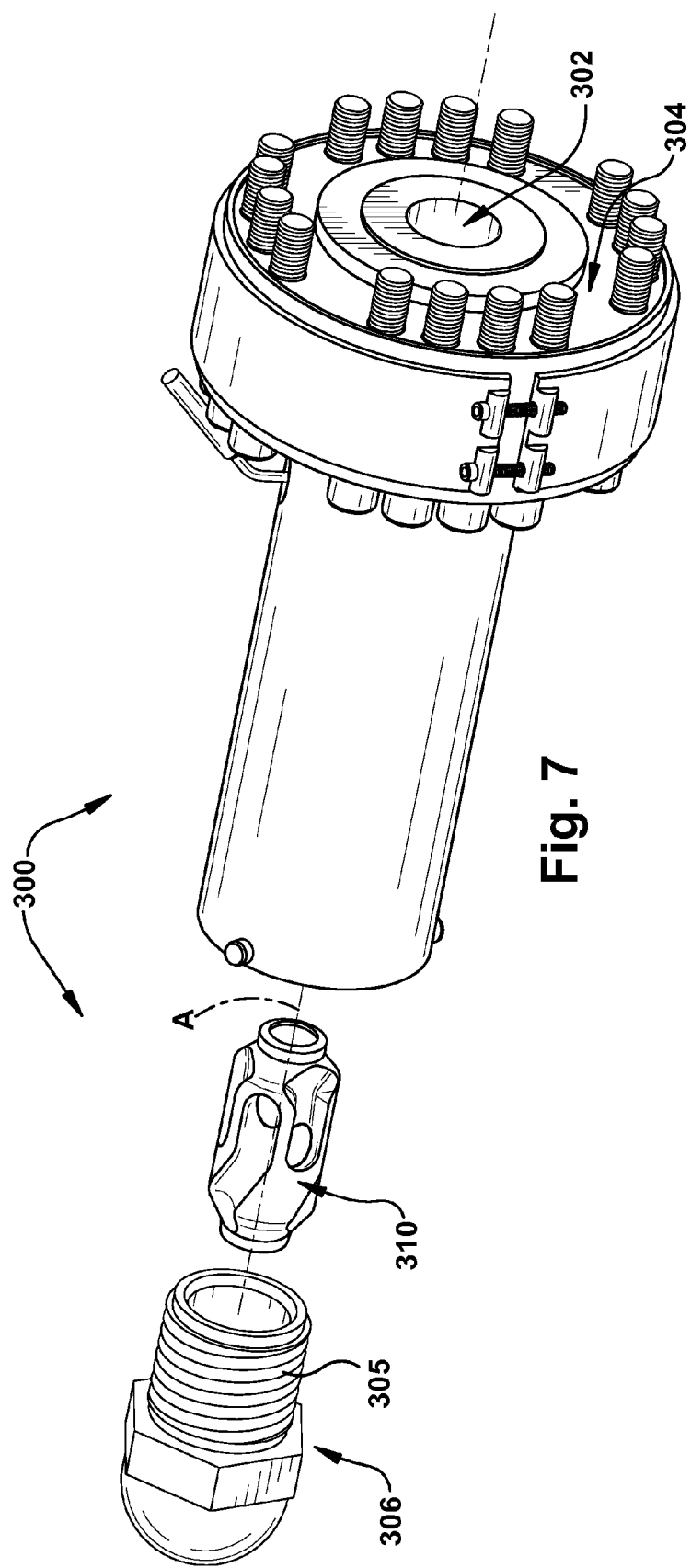
FIG. 7 depicts an isometric exploded view of a nozzle assembly having a dynamic mixer in accordance with a further embodiment of the invention.
Figure 8:
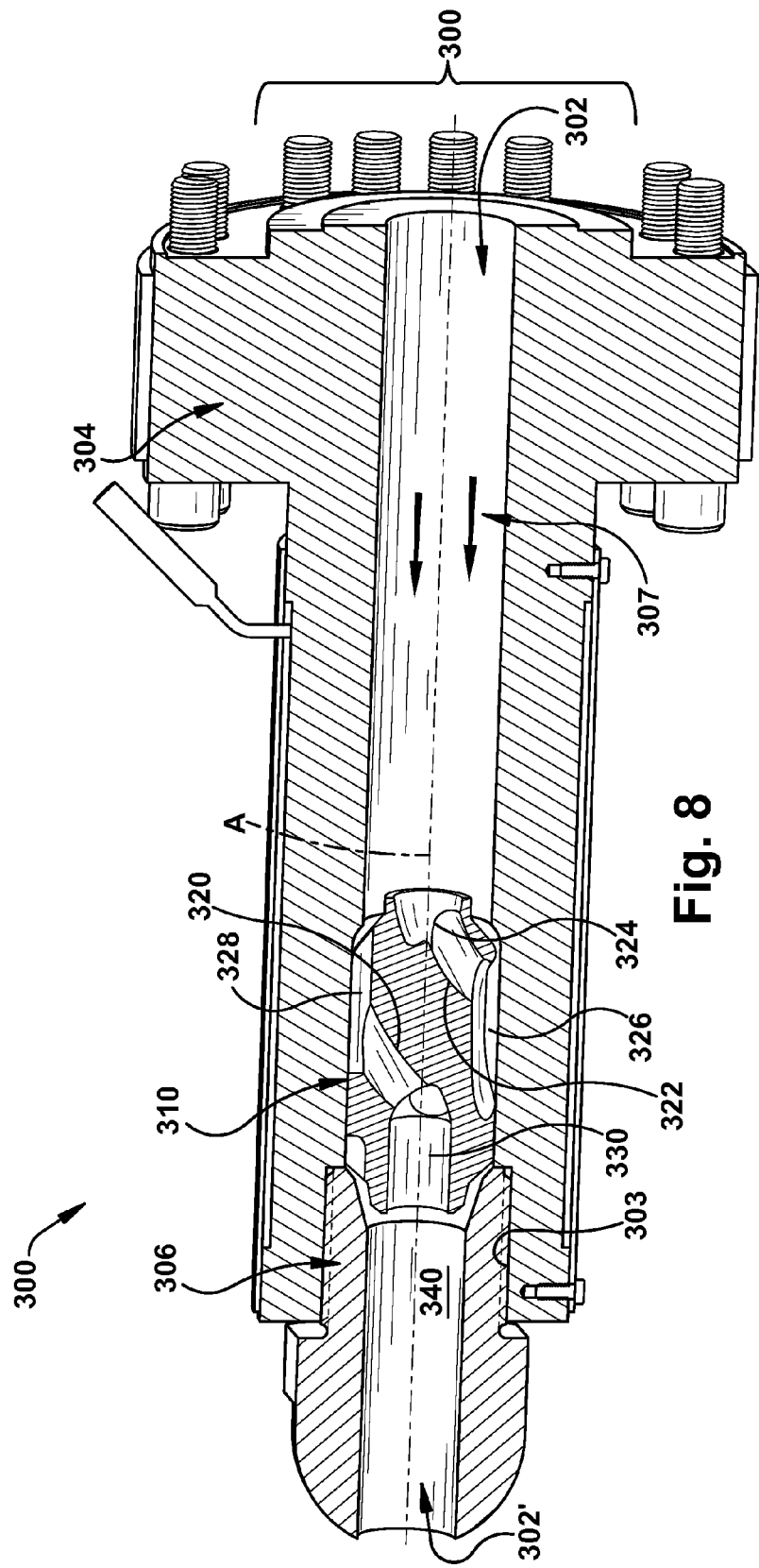
FIG. 8 depicts a cross-sectional view of the nozzle assembly of FIG. 7 having a dynamic mixer in accordance with the further embodiment of the invention.
Figure 9:
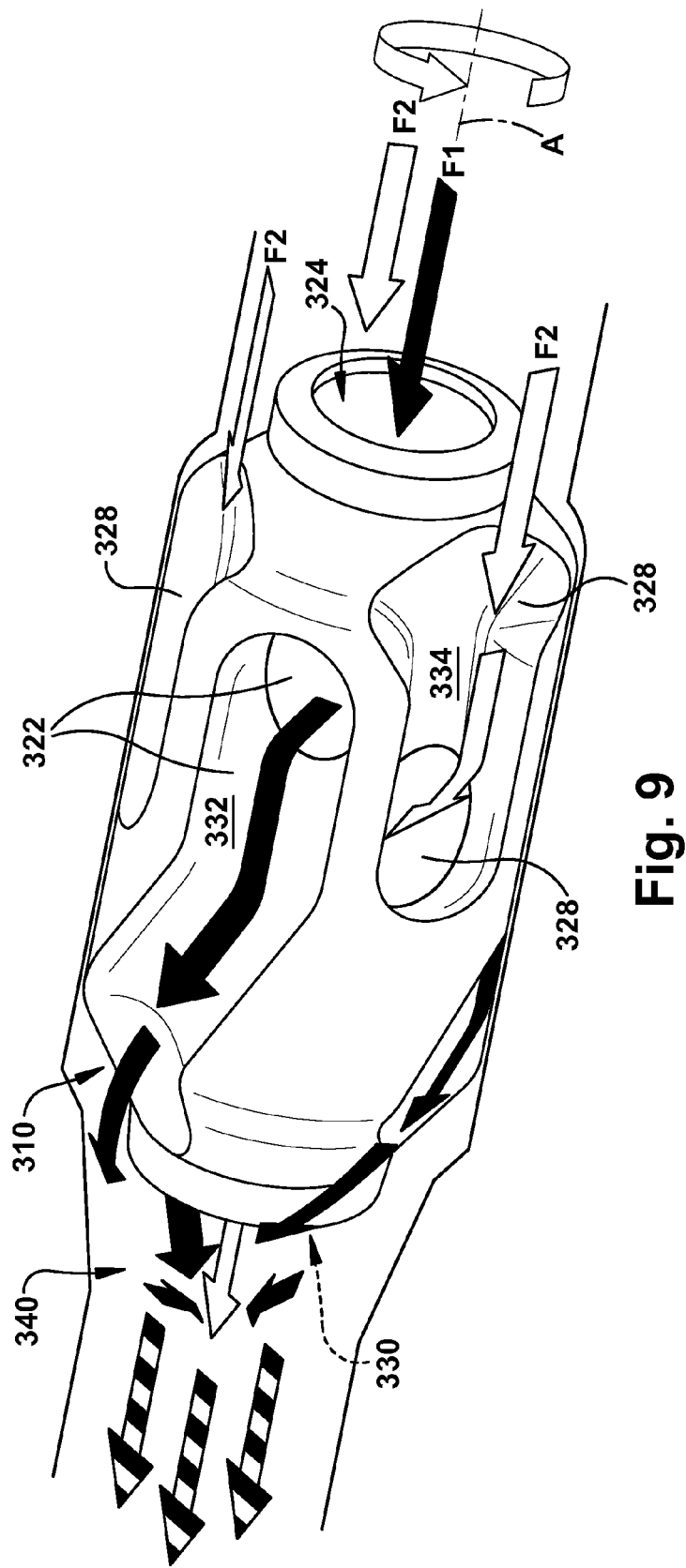
FIG. 9 depicts an isometric view of a dynamic mixer shown in FIG. 7 in accordance with the further embodiment of the invention.

Turning to FIGS. 7-9, a further embodiment of a nozzle assembly 300 having a different type of dynamic mixer 310 is shown. In this embodiment, dynamic mixer 310 is implemented as a unitary structure that rotates in response to a melt flow. Similar to the previous embodiment, dynamic mixer 310 may be implemented, at least in part, in a machine nozzle melt channel 302.

FIG. 7 depicts an exploded perspective view of machine nozzle assembly 300 having a machine nozzle adaptor body 304 and a machine nozzle tip 306. As shown, dynamic mixer 310 resides essentially at the interface of machine nozzle tip 306 and machine nozzle body 304, which are coupled by threads 305 and threads 303 (FIG. 8). However, it is understood that: (a) dynamic mixer 310 may reside anywhere within the machine nozzle melt channel 302, 302' (FIG. 8); and (b) machine nozzle tip 306 and machine nozzle adaptor body 304 may be coupled in any fashion, e.g., bolts, clamps, etc.

FIG. 8 depicts a cross-sectional view of machine nozzle assembly 300 having dynamic mixer 310 installed therein. As shown, dynamic mixer 310 is shaped to fit within machine nozzle assembly 300 such that dynamic mixer 310 is partially within machine nozzle adaptor body 304 and partially within machine nozzle tip 306. A bearing seat 326 can be used to further maintain the dynamic mixer 310 in position while also allowing dynamic mixer 310 to rotate as described herein.

Dynamic mixer 310, similar to dynamic mixer 110 described above in FIGS. 2-6, is configured to be driven, i.e., rotated about its longitudinal axis "A", by the melt that is forced through nozzle melt channel 302 as shown by directional arrows 307. In contrast to dynamic mixer 110, which includes a rotor assembly 114 and stator assembly 116, dynamic mixer 310 of this embodiment is a unitary device that comprises only a rotor assembly and does not include a stator assembly.

When the flowing melt passes the upstream end of dynamic mixer 310, dynamic mixer 310 acts to redirect the melt flow and promote mixing of the melt, through the use of helical channel(s) 322, 328. Helical channels 322, 328 are shaped to cause rotation of dynamic mixer 310 in response to the melt flow.

FIG. 9 depicts an isometric view of dynamic mixer 310 in further detail. As can be seen in FIGS. 8 and 9, dynamic mixer 310 has a plurality of helical channels 322, 328, including at least one "in-to-out" helical channel 322 and at least one "out-to-in" helical channel 328. Each "in-to-out" helical channel 322 receives flow from an upstream interior opening 324 and redirects the flow outwardly to a downstream exterior surface groove 332. Each "out-to-in" helical channel 328 receives flow along an upstream exterior surface groove 334 and redirects the flow through an interior channel 320 to a downstream interior opening 330. It is understood the number and placement of helical channels 322, 328 may vary.

As shown in FIG. 9 by arrows F1, F2, each "in-to-out" helical channel 322 redirects flow F1 coming into upstream interior opening 324 outwardly towards the melt channel sidewalls and around dynamic mixer 310. Conversely, each "out-to-in" helical channel 328 redirects flow F2 traveling along the melt channel sidewalls inwardly through dynamic mixer 310. A collision zone 340 is formed just beyond a downstream end of dynamic mixer 310. Because the melt flow F1, F2 is redirected by the helical channels 322, 328 from the central region to the sidewall region and vice versa, the melt flow will exit dynamic mixer 310 at a variety of different angles. The result is an enhanced mixing of the melt flow F1, F2 at collision zone 340.

Helical channels 322, 328 may be shaped in any manner to promote rotation and mixing. In particular, rotation of dynamic mixer 310 is achieved by, e.g., angling and arcing helical channels 322, 328 to cause a rotational force in response to a melt flow F1, F2. Because dynamic mixer 310 is free to rotate around its longitudinal axis A, the melt flow F1, F2 moving through the shaped helical channels 322, 328 will act to cause rotation. Therefore, the melt flow F1, F2 will be discharged from helical channels 322, 328 at varying velocities and angles, agitating the flow, and resulting in a more homogeneous melt.

Figure 10:
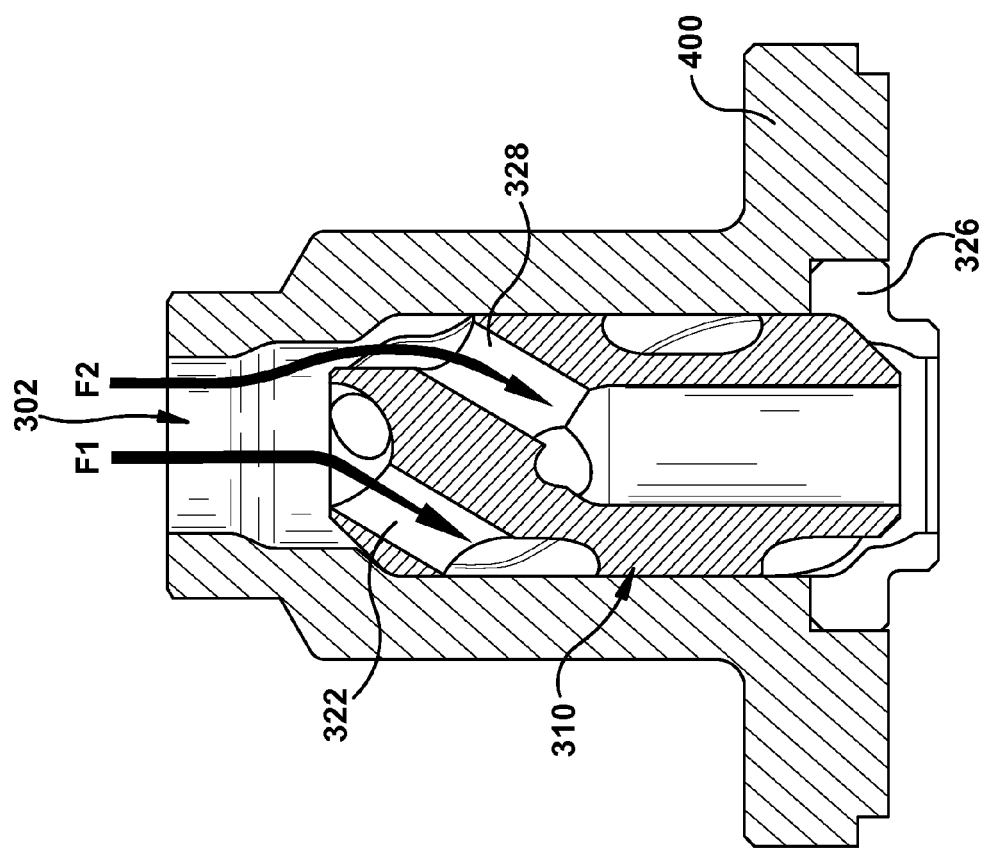
FIG. 10 depicts a cross-sectional view of a bushing having the dynamic mixer of FIG. 9 in accordance with the further embodiment of the invention.
Figure 12:
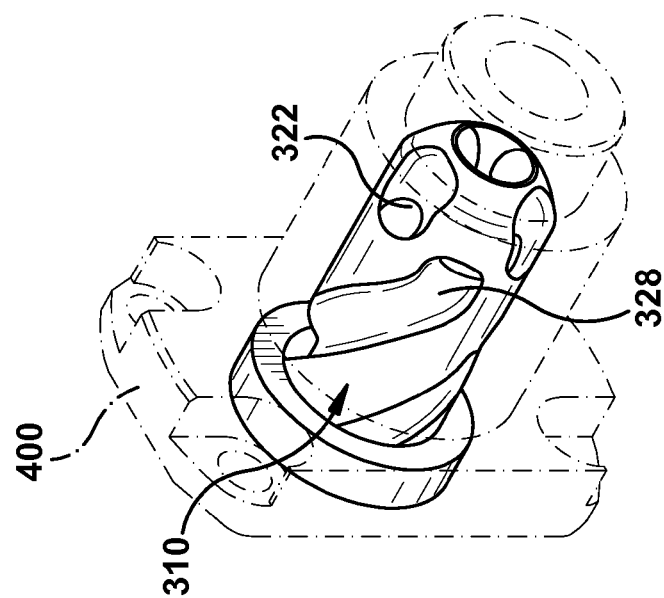
FIG. 12 depicts an isometric view of the bushing (in phantom) and dynamic mixer of FIG. 10 in accordance with the further embodiment of the invention.
Figure 11:
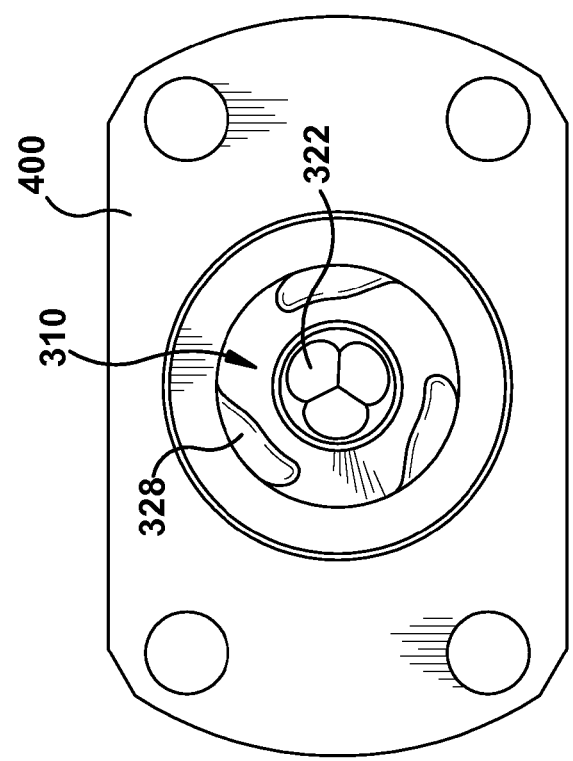
FIG. 11 depicts an end view of the bushing of FIG. 10 in accordance with the further embodiment of the invention.

FIGS. 1-9 describe embodiments in which a dynamic mixer 110, 210, 310 is incorporated into a nozzle assembly 112, 200, 300. However, as noted, the dynamic mixer 110, 210, 310 could likewise be placed anywhere along the melt channel prior to reaching the first split of the hot runner assembly. FIGS. 10-12 show dynamic mixer 310 incorporated into a bushing 400 as an example of an alternate implementation.

As shown in the cross-sectional view of FIG. 10, dynamic mixer 310 is located and held within a cavity of bushing 400 with bearing seat 326. The operation of dynamic mixer 310 is similar to the prior embodiments when placed in bushing 400, i.e., flow F1 and F2 passes through both "in-to-out" helical channels 322 and "out-to-in" helical channels 328, respectively, to cause rotation and mixing. In the end view shown in FIG. 11, it can be seen that dynamic mixer 310 includes three "in-to-out" helical channels 322 and three "out-to-in" helical channels 328. However, as noted, any number of each may be utilized. It is also appreciated that dynamic mixer 210 shown in FIGS. 2-9 could likewise be implemented in a bushing 400.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An injection molding system, comprising:
   an injection unit that delivers a melt flow to a plurality of splits in a hot runner assembly via a melt channel; and
   a dynamic mixer incorporated into the melt channel, wherein the dynamic mixer includes a rotor assembly configured to be rotationally driven by the melt flow, and wherein the dynamic mixer is further configured to mix the melt flow passing through the melt channel.

2. The injection molding system of claim 1, wherein the dynamic mixer further includes a stator assembly that is configured to mix the melt flow passing through the melt channel.

3. The injection molding system of claim 2, wherein the rotor assembly is rotatable relative to the stator assembly to cooperatively mix the melt flow.

4. The injection molding system of claim 3, wherein the rotor assembly includes at least one rotor-drive groove on a surface of the rotor assembly to impart a rotational force on the rotor assembly in response to a melt flow.

5. The injection molding system of claim 4, wherein the rotor assembly includes at least one inner rotor melt channel on an upstream side that passes melt flow outwardly to an associated rotor-drive groove to form a collision zone.

6. The injection molding system of claim 5, wherein the rotor assembly includes a plurality of channels on a downstream side that are configured to channel melt flow inwardly.

7. The injection molding system of claim 6, wherein the stator assembly includes a plurality of channels on a receiving side that are configured to channel melt flow inwardly.

8. The injection molding system of claim 1, wherein the dynamic mixer is incorporated into a nozzle assembly positioned along the melt channel.

9. The injection molding system of claim 1, wherein the dynamic mixer is incorporated into a bushing along the melt channel.

10. The injection molding system of claim 1, wherein the rotor assembly includes at least one helical channel that directs melt flow from an upstream interior opening outwardly to a downstream exterior surface groove.

11. The injection molding system of claim 10, wherein the rotor assembly further includes at least one helical channel that directs melt flow from an upstream exterior surface groove inwardly to a downstream interior opening.

12. A nozzle assembly, comprising:
    a machine nozzle adaptor body;
    a machine nozzle tip;
    a melt channel passing through the machine nozzle adaptor body and machine nozzle tip configured to deliver a melt flow; and
    a dynamic mixer incorporated into the melt channel, wherein the dynamic mixer comprises a rotor assembly configured to be rotationally driven by the melt flow, and wherein the dynamic mixer is further configured to mix the melt flow passing through the melt channel.

13. The nozzle assembly of claim 12, wherein the dynamic mixer further includes a stator assembly that is configured to mix the melt flow passing through the melt channel.

14. The nozzle assembly of claim 13, wherein the rotor assembly is rotatable relative to the stator assembly to cooperatively mix the melt flow.

15. The nozzle assembly of claim 14, wherein the rotor assembly includes at least one rotor-drive groove on an upstream side of the rotor assembly to impart a rotational force on the rotor assembly in response to a melt flow.

16. The nozzle assembly of claim 15, wherein the rotor assembly includes at least one inner rotor melt channel that passes melt flow outwardly to an associated rotor-drive groove to form a collision zone.

17. The nozzle assembly of claim 16, wherein the rotor assembly includes a plurality of channels on a downstream side that are configured to channel melt flow inwardly.

18. The nozzle assembly of claim 17, wherein the stator assembly includes a plurality of channels on a receiving side that are configured to channel melt flow inwardly.

19. The nozzle assembly of claim 13, wherein the stator assembly is machined into the machine nozzle tip.

20. The nozzle assembly of claim 12, wherein the rotor assembly includes at least one helical channel that directs melt flow from an upstream interior opening outwardly to a downstream exterior surface groove.

21. The nozzle assembly of claim 20, wherein the rotor assembly further includes at least one helical channel that directs melt flow from an upstream exterior surface groove inwardly to a downstream interior opening.

22. A device, configured for incorporation into a melt channel of an injection molding system upstream from a plurality of splits associated with a hot runner assembly, wherein the device comprises a rotor assembly configured to be rotationally driven by a melt flow, and wherein the rotor assembly is further configured to mix the melt flow passing through the melt channel.

23. The device of claim 22, further including a stator assembly that is configured to mix the melt flow passing through the melt channel.

24. The device of claim 23, wherein the rotor assembly is rotatable relative to the stator assembly to cooperatively mix the melt flow.

25. The device of claim 24, wherein the rotor assembly includes at least one rotor-drive groove on an upstream side of the rotor assembly to impart a rotational force on the rotor assembly in response to a melt flow.

26. The device of claim 25, wherein the rotor assembly includes at least one inner rotor melt channel that passes melt flow outwardly to an associated rotor-drive grove to form a collision zone.

27. The device of claim 26, wherein the rotor assembly includes a plurality of channels on a downstream side that are configured to channel melt flow inwardly.

28. The device of claim 27, wherein the stator assembly includes a plurality of channels on a receiving side that are configured to channel melt flow inwardly.

29. The device of claim 23, wherein the stator assembly is machined into a machine nozzle tip of a nozzle assembly.

30. The device of claim 22, wherein the rotor assembly includes at least one helical channel that directs melt flow from an upstream interior opening outwardly to a downstream exterior surface groove.

31. The device of claim 30, wherein the rotor assembly further includes at least one helical channel that directs melt flow from an upstream exterior surface groove inwardly to a downstream interior opening.

* * * * *